United States Patent
Kruse et al.

(10) Patent No.: US 9,656,208 B2
(45) Date of Patent: May 23, 2017

(54) EXHAUST GAS TREATMENT UNIT FOR AN EXHAUST GAS RECIRCULATION LINE AND INTERNAL COMBUSTION ENGINE AND MOTOR VEHICLE HAVING AN EXHAUST-GAS TREATMENT UNIT

(71) Applicant: EMITEC GESELLSCHAFT FUER EMISSIONSTECHNOLOGIE MBH, Lohmar (DE)

(72) Inventors: Carsten Kruse, Troisdorf (DE); Gottfried Wilhelm Haesemann, Kuerten (DE); Bruno Kravetz, Lagesbuette (DE)

(73) Assignee: EMITEC Gesellschaft fuer Emissiontechnologie mbH, Lohmar (DE)

( * ) Notice: Subject to any disclaimer, the term of this patent is extended or adjusted under 35 U.S.C. 154(b) by 0 days.

(21) Appl. No.: 13/845,341

(22) Filed: Mar. 18, 2013

(65) Prior Publication Data
US 2013/0213019 A1   Aug. 22, 2013

Related U.S. Application Data

(63) Continuation of application No. PCT/EP2011/066160, filed on Sep. 17, 2011.

(30) Foreign Application Priority Data

Sep. 17, 2010   (DE) .................. 10 2010 045 871

(51) Int. Cl.
*F01N 3/10*   (2006.01)
*B01D 53/94*   (2006.01)
(Continued)

(52) U.S. Cl.
CPC .............. *B01D 53/94* (2013.01); *F01N 3/10* (2013.01); *F01N 3/28* (2013.01); *F01N 3/2839* (2013.01);
(Continued)

(58) Field of Classification Search
CPC ...... F01N 3/2803; F01N 3/2807; F01N 3/281; F01N 3/2835; F01N 3/2839; F01N 3/285;
(Continued)

(56) References Cited

U.S. PATENT DOCUMENTS 3,017,255 A * 1/1962 Arthur Norris William . 422/180
3,983,696 A  10/1976 Pflugfelder
(Continued)

FOREIGN PATENT DOCUMENTS

DE           3603882 A1    8/1986
DE           4303950 C1 * 10/1994
(Continued)

*Primary Examiner* — Patrick Maines
(74) *Attorney, Agent, or Firm* — Laurence A. Greenberg; Werner H. Stemer; Ralph E. Locher

(57) ABSTRACT

An exhaust gas treatment unit includes a substantially cylindrical exhaust gas treatment body having a main axis and, on at least one opening side of the exhaust gas treatment unit, at least one of the following connecting devices or connectors: an offset compression zone or a molded structure for form-locking engagement. An internal combustion engine includes at least one exhaust gas treatment unit and at least one exhaust gas conducting line. The at least one exhaust gas treatment unit is completely introduced in the at least one exhaust gas conducting line. A motor vehicle having at least one exhaust-gas treatment unit is also provided.

12 Claims, 7 Drawing Sheets

(51) Int. Cl.
*F01N 3/28* (2006.01)
*F02M 26/15* (2016.01)
*F02M 26/35* (2016.01)
*F01N 13/18* (2010.01)

(52) U.S. Cl.
CPC ....... *F01N 3/2842* (2013.01); *F01N 13/1838* (2013.01); *F02M 26/15* (2016.02); *F02M 26/35* (2016.02); *F01N 13/18* (2013.01); *F01N 2350/00* (2013.01); *F01N 2450/02* (2013.01); *F01N 2450/20* (2013.01)

(58) Field of Classification Search
CPC .... F01N 3/2875; F01N 3/2878; F01N 3/2882; F01N 2350/00; F01N 2450/16; F01N 2450/18; F01N 2450/20; F01N 2450/28; F01N 2450/30; F01N 2450/40; F01N 3/2885; F01N 3/28; F01N 3/2892; F01N 2013/026; F01N 13/14; F01N 13/10; F01N 3/0211; F01N 3/022; F01N 3/10; F01N 3/2842; B01D 46/2418; B01D 46/2422; B01D 2279/30; B01D 53/92; B01D 53/9454
USPC ..... 60/297, 299, 311, 302; 55/523, DIG. 30; 422/177

See application file for complete search history.

(56) References Cited

U.S. PATENT DOCUMENTS

| | | | |
|---|---|---|---|
| 4,248,833 A | 2/1981 | Aoyama | |
| 4,523,780 A * | 6/1985 | Cheer | 285/399 |
| 4,818,497 A * | 4/1989 | Andersson et al. | 422/179 |
| 5,055,274 A * | 10/1991 | Abbott | 422/171 |
| 5,888,457 A * | 3/1999 | Tosa et al. | 422/179 |
| 6,059,338 A * | 5/2000 | Diederichs | 285/55 |
| 6,260,891 B1 * | 7/2001 | Foering et al. | 285/382.2 |
| 6,581,983 B1 * | 6/2003 | Viegener | 285/382 |
| 6,660,235 B1 | 12/2003 | Holpp et al. | |
| 6,824,744 B1 * | 11/2004 | Stoepler et al. | 422/179 |
| 7,258,843 B2 | 8/2007 | Brück et al. | |
| 8,100,438 B2 | 1/2012 | Grimm | |
| 2001/0032460 A1 * | 10/2001 | Hisanaga | F01N 13/08 60/323 |
| 2002/0096225 A1 * | 7/2002 | Ishizu et al. | 138/114 |
| 2004/0227346 A1 * | 11/2004 | Jamison et al. | 285/381.3 |
| 2005/0253387 A1 | 11/2005 | Fritz et al. | |
| 2006/0186176 A1 * | 8/2006 | Wilks et al. | 228/56.3 |
| 2008/0053080 A1 * | 3/2008 | Faust et al. | 60/311 |
| 2009/0211832 A1 * | 8/2009 | Grimm | 180/309 |

FOREIGN PATENT DOCUMENTS

| | | |
|---|---|---|
| DE | 19508217 A1 | 9/1996 |
| DE | 10045540 A1 | 3/2002 |
| DE | 10216272 A1 * | 11/2003 |
| DE | 10357953 A1 * | 7/2005 |
| DE | 102004023995 A1 | 12/2005 |
| DE | 202007003480 U1 | 5/2007 |
| DE | 102007060398 A1 | 6/2009 |
| DE | 102008010736 A1 | 8/2009 |
| EP | 1009924 B1 | 11/2002 |
| JP | S50155821 A | 12/1975 |
| JP | S58109512 U | 7/1983 |
| JP | H0474665 B2 | 11/1992 |
| JP | H0634123 A | 2/1994 |
| JP | H0724330 A | 1/1995 |
| JP | H09108576 A | 4/1997 |
| JP | 2003056337 A * | 2/2003 |
| JP | 2006090292 A | 4/2006 |
| JP | 4032678 B2 * | 1/2008 |
| JP | 2012077699 A * | 4/2012 |

* cited by examiner

EXHAUST GAS TREATMENT UNIT FOR AN EXHAUST GAS RECIRCULATION LINE AND INTERNAL COMBUSTION ENGINE AND MOTOR VEHICLE HAVING AN EXHAUST-GAS TREATMENT UNIT

CROSS-REFERENCE TO RELATED APPLICATION

This application is a continuation, under 35 U.S.C. §120, of copending International Application No. PCT/EP2011/066160, filed Sep. 17, 2011, which designated the United States; this application also claims the priority, under 35 U.S.C. §119, of German Patent Application DE 10 2010 045 871.6, filed Sep. 17, 2010; the prior applications are herewith incorporated by reference in their entirety.

BACKGROUND OF THE INVENTION

Field of the Invention

The present invention relates to an exhaust-gas treatment unit for an internal combustion engine, in particular a catalyst carrier body integrated into an exhaust-gas recirculation line (EGR line) of a motor vehicle engine. The invention also relates to an internal combustion engine and a motor vehicle having an integrated exhaust-gas treatment unit.

It is known for the exhaust gases of a mobile internal combustion engine to be purified of undesired constituents which pose a health concern and/or are harmful to the environment, in particular in such a way that the exhaust gases also meet the emissions requirements of future legal regulations. Retrofit systems for the treatment of the exhaust gases are desirable, inter alia, for that purpose, so that an adaptation of existing engine concepts to future exhaust-gas purification targets is made possible in a simple manner. Likewise, constant efforts are being made to integrate the exhaust-gas treatment units required for that purpose in the vehicle in a particularly effective, space-saving and inexpensive manner.

One possibility for meeting those requirements is, for example, the provision of a so-called close-coupled catalytic converter which is positioned in the direct vicinity of the internal combustion engine and, if appropriate, even partially in an engine outlet and/or a manifold inlet. An example of such a catalyst carrier body for close-coupled installation is disclosed in European Patent EP10 09 924 B1, corresponding to U.S. Pat. No. 6,660,235.

Such exhaust-gas treatment units are generally inserted into the exhaust-gas-conducting lines and are fixedly connected by a fastening device or fastener situated at the outside such as, for example, a flange and/or a collar, to the internal combustion engine and/or the exhaust line (the manifold), and positioned by using structural elements (for example screw connections) and/or weld seams. The production of such a flange/collar is cumbersome, however, so that in that case, considerable costs are incurred specifically with regard to mass production.

SUMMARY OF THE INVENTION

It is accordingly an object of the invention to provide an exhaust gas treatment unit for an exhaust gas recirculation line and an internal combustion engine and a motor vehicle having an exhaust-gas treatment unit, which overcome the hereinafore-mentioned disadvantages and at least partially solve the highlighted problems of the heretofore-known units, engines and vehicles of this general type. In particular, it is sought to permit a space-saving and secure integration of an exhaust-gas treatment unit in the vicinity of the internal combustion engine. It is furthermore also sought to achieve an inexpensively produced and easily assembled exhaust-gas treatment unit.

With the foregoing and other objects in view there is provided, in accordance with the invention, an exhaust-gas treatment unit, comprising a substantially cylindrical exhaust-gas treatment body with a main axis and, on at least one opening side of the exhaust-gas treatment unit, at least one of the following connecting devices or connectors:

an offset crimp, compression, pinch or squeeze zone, and a shaped structure for form-locking engagement.

A form-locking connection is one which connects two elements together due to the shape of the elements themselves, as opposed to a force-locking connection, which locks the elements together by force external to the elements.

The exhaust-gas treatment unit substantially constitutes a structural unit, in the form of an auxiliary system and/or retrofit system, through which the following functions can be realized: treatment of the exhaust gas and permanent, fixed positioning in an exhaust-gas-conducting line. In this case, the function of the positioning is performed, in particular, by a (preferably one-piece) housing. The housing forms, for example, a type of (metallic) shell region which receives, and thus also provides dimensional stability to, (at least) one exhaust-gas treatment body through which the exhaust gas can flow. For this purpose, it is possible in particular for a brazed connection and/or welded connection to the exhaust-gas treatment body to be formed. In particular, a direct or immediate connection of the housing and exhaust-gas treatment body is thus realized (without, for example, an intermediate housing, mounting mats or the like).

The exhaust-gas treatment body is, in particular, a catalytically active body. The exhaust-gas treatment body may, in particular, be constructed from coiled and/or wound metallic sheet-metal foils, which may be smooth and/or structured. In this case, the sheet-metal foils are preferably disposed in such a way that a honeycomb body with a plurality of channels or ducts (running substantially parallel to one another) is formed. Furthermore, the foils have a catalytically active coating. In particular, the foils include so-called washcoat and catalytically active material applied thereto. It is preferable for the sheet-metal foils to be in direct contact with the housing and/or connected thereto.

The exhaust-gas treatment body and the housing surrounding it preferably have a substantially cylindrical form. This means, in particular, that the cross-sectional shape normal to the main axis of the exhaust-gas treatment body is substantially cylindrical. Exhaust-gas-conducting lines are in many cases cylindrical. The basic shape of the exhaust-gas treatment body may self-evidently also be adapted to other cross sections of the exhaust-gas-conducting line. The expression "substantially" thus also encompasses conventional cross sections of the exhaust-gas-conducting lines such as, for example, an oval, a polygon or the like. What is important in this case is the predominantly uniform spacing to the wall of the respective exhaust-gas-conducting line.

The main axis of the exhaust-gas treatment body is generally congruent with the main axis of a respective exhaust-gas-conducting line. This does not mean that the main axis must imperatively be congruent with the direction of the filter ducts or channels of the exhaust-gas treatment body. This rather means that the entry direction of the exhaust gas and also the exit direction of the exhaust gas are identically substantially normal to the main axis. The main axis is often congruent with the normal to the geometric center of the inlet and/or outlet surface of the exhaust-gas treatment body.

The crimp zone of the exhaust-gas treatment unit performs the task of providing the force-locking connection to an exhaust-gas-conducting line. The crimp zone is preferably formed (only) with the housing, in such a way that the axial portion of the housing is in particular not filled, or is at least not completely filled, by the exhaust-gas treatment body. The crimp zone has, in particular, an oversize in relation to the rest of the exhaust-gas treatment unit. The oversize is suitable for forming force-locking contact, or an interference fit, with the exhaust-gas-conducting line. The crimp zone is, in particular, constructed in such a way that it deforms (radially) inward (if appropriate also in the direction of the exhaust-gas treatment body), preferably without (significantly) deforming the exhaust-gas treatment body itself. In order to form the interference fit, the crimp zone may undergo both elastic and also plastic deformation. In this case, the plastic deformation is particularly preferable. With the plastic deformation, it is ensured that the friction force resulting from the elastic deformation component associated with the plastic deformation is at a maximum. The crimp zone may, however, also be constructed in such a way that a defective exhaust-gas treatment unit and/or a functional exhaust-gas treatment unit installed in a damaged structural element can be removed again with little effort and without damage to the surrounding structural elements and/or to the exhaust-gas treatment unit.

The crimp zone may be provided in a variety of embodiments. In particular, the crimp zone may take the form of a slotted spring ring, a closed temperature expansion ring and/or an elongation of the housing with a cross section which differs from the basic shape. The crimp zone may also take the form of at least one bulge of the (in particular one piece) housing. The bulge may be formed in such a way that a deformation of the bulge resulting from the installation causes little to no deformation of the rest of the housing. That is to say, in particular, that that part of the housing which is (radially and/or axially adjacently) in contact with the exhaust-gas treatment body is subjected to only little to no deformation. Such a bulge may, in particular, be formed with a spacing of up to 20 mm [millimeters], wherein it is preferable for at least 2 and very particularly preferably at most 5 bulges to be disposed on a periphery or circumference of the housing.

The crimp zone is offset with respect to the exhaust-gas treatment body. In this case, "offset" means in particular that no deformation influence or only a minor deformation influence can be exerted on the exhaust-gas treatment body, and accordingly practically only in one portion of the housing. This may be achieved, in particular, by virtue of an offset, a change in cross section, a change in shape of the cross section and/or the like being provided between the crimp zone and the exhaust-gas treatment body. Such an offset may take the form of a step, a bend, a curve (as viewed in a longitudinal section through the housing) and/or a cohesive connection, that is to say a welded connection and/or a brazed connection.

The shaped structure for form-locking engagement may, in particular, constitute a toothing which engages into a corresponding structure in the exhaust-gas-conducting line and prevents an inadvertent loosening during operation. The shaped structure (and a corresponding line structure) may be constructed in such a way that the exhaust-gas treatment unit can be removed without damage to the exhaust-gas treatment unit and/or to the exhaust-gas-conducting line, for example in the event of necessary repairs in the region of the exhaust-gas treatment unit. The shaped structure may, in particular, also be a thread, and the line structure may have a matching counterpart thread, or a thread may be formed directly into the line during assembly. The shaped structure may, however, very particularly preferably also constitute a toothing which, through elastic deformation of the shaped structure or of the respective portion of the housing, can be inserted into the corresponding structure of the exhaust-gas-conducting line. In this case, the shaped structure is considerably greater than the conventional roughnesses in the case of a housing of that type, and in particular protrudes at least 1 mm [millimeter] and particularly preferably at most 5 mm [millimeters] beyond the outer surface of the housing.

The at least one connecting device or connector is furthermore situated on at least one opening side of the exhaust-gas treatment unit. This means, in particular, that portion of the housing which adjoins an opening side. It is preferable for only a (single) crimp zone or shaped structure to be provided, which furthermore extends, in particular, only over a limited portion of the exhaust-gas treatment unit proceeding from the opening side. Through the use of the connecting device or connector, it is thus possible in particular in an assembly direction and/or disassembly direction, for an upstream and/or downstream, force-locking and/or form-locking connection to the exhaust-gas-conducting line to be formed.

Even though it is possible for both connecting devices or connectors (crimp zone and shaped structure) to be provided on a housing, a separate provision is preferable, depending on the usage situation in a housing, in order to keep the manufacturing outlay for the production process low.

In accordance with another advantageous feature of the exhaust-gas treatment unit of the invention, the at least one connecting device or connector has a cross section which differs from the substantially cylindrical exhaust-gas treatment body. The cross section may, in particular, be formed so as to effect a suitable deformation with the result of a force-locking and/or form-locking connection to an exhaust-gas-conducting line. In this case, the cross section may occasionally differ from the shape of the cylindrical exhaust-gas treatment body only in places (locally), in order to thereby further minimize the influence of the mechanical deformation on the exhaust-gas treatment body. The cross section may also differ from the shape of the exhaust-gas treatment body in such a way as to assist simple assembly. In this case, consideration should be given, in particular, to cross sections which permit the use of tools which assist an insertion with simultaneous prestressing of the crimp zone, for example. Furthermore, the cross section may have folds and similarly acting spring devices or springs over the circumference, which in assist an elastic action of the crimp zone, for example.

It is basically stated herein that the cross sections of the exhaust-gas treatment unit in the region of the exhaust-gas treatment body and in the region of the at least one connecting device or connector may differ (with regard to the circumference and/or the area and/or the overlap) by at least 2%, in particular by at least 5%. This means, in particular, that the cross section in the region of the at least one connecting device or connector has a non-circular and/or eccentric form in relation to the cross section in the region of the exhaust-gas treatment body. In this case, consideration is given in particular to combinations of radially (at least partially) protruding cross sections (circular shape, oval, polygon, racetrack shape, etc.).

In accordance with a further advantageous feature of the exhaust-gas treatment unit of the invention, the at least one connecting device or connector is disposed eccentrically with respect to the main axis. In this way, it can in particular be achieved that the exhaust-gas treatment unit bears partially without play against the exhaust-gas-conducting line. This greatly assists stability. It can also be achieved in this way that the surface which has a force-locking and/or form-locking action extends further over the portion of the exhaust-gas treatment unit. It is furthermore also possible in this way for there to be provided over the circumference of the exhaust-gas treatment unit regions which, for possible disassembly, permit an engagement of corresponding tools.

In accordance with an added advantageous feature of the exhaust-gas treatment unit of the invention, the exhaust-gas treatment unit has a housing, and the housing and the at least one connecting device or connector are formed in one piece. In this way, it is possible to avoid disadvantages in conjunction with joining connections, reworking operations and fluctuations in material characteristics between the at least one connecting device or connector and the exhaust-gas treatment unit (or the housing). It is furthermore advantageous that, in this way, no additional structural element is required. Merely an elongation of the housing, and/or under some circumstances further working of the housing by deformation in the region of the desired connecting device or connector, is then necessary.

In a further advantageous embodiment of the exhaust-gas treatment unit according to the invention, the exhaust-gas treatment unit merges in a flowing manner into the at least one connecting device or connector. This means, in particular, that the housing forms a continuous slope (for example a widening) over the entire extent of the exhaust-gas treatment unit including the at least one connecting device or connector. In this case, the housing may (in part) have the shape of a cone and/or of a single-sided cone, and/or may have a bulged form and/or outwardly curved form. This may be advantageous in particular if, in this way, the insertion of the exhaust-gas treatment unit with a crimp zone and/or shaped structure is assisted by the flowing transition to the crimp zone and/or shaped structure. In order to prevent deformation of the internally disposed exhaust gas treatment body, both deformation portions as well as relief slots may be provided. It is advantageous, in particular, for the exhaust-gas treatment body to have no connection to those parts of the shell surface (or of the housing) which merge in a flowing manner into the crimp zone or shaped structure. This means, in particular, that those regions of the housing of the exhaust-gas treatment unit which are connected to the exhaust-gas treatment body have substantially no change in cross section over the entire extent of the exhaust-gas treatment unit.

With the objects of the invention in view, there is also provided an internal combustion engine, comprising at least one exhaust-gas treatment unit, and at least one exhaust-gas-conducting line, wherein the at least one exhaust-gas treatment unit is inserted entirely in the at least one exhaust-gas-conducting line.

The internal combustion engine is constructed as a conventional internal combustion engine and is constructed for operation with gasoline or diesel fuel. The internal combustion engine may thus be a conventional reciprocating-piston engine or plunger-piston engine (for example Otto-cycle engine or diesel engine), a rotary piston engine or a rotary engine (Wankel engine). Operation with other internal combustion engines based on a closed cycle is also conceivable. In this case, the internal combustion engine is preferably part of a motor vehicle, in particular of an automobile.

Exhaust-gas-conducting bores are provided for the expulsion of the burned mixture from the internal combustion engine. Furthermore, internal combustion engines are known in which, according to demand, a part of the (untreated) exhaust gas is recirculated again (exhaust-gas recirculation line or EGR line). The expression "exhaust-gas-conducting line" thus encompasses not only the conventional exhaust-gas-conducting bores but also the bores provided in the internal combustion engine for the intake line. It is important in this case, in particular, that these are lines (or bores, etc.) which are (at least partially and/or intermittently) traversed by exhaust gas, which are integrated into the internal combustion engine and which are formed and/or enclosed by the engine casing. The lines are thus particularly stable and may constitute a corresponding counterbearing for a crimp zone of the exhaust-gas treatment unit. This refers, in particular, to a line portion which extends through a part of the internal combustion engine, in particular in the form of a bore through the cylinder head, of an exhaust-gas-recirculating line. In particular, the respective line portion is situated, as viewed in the flow direction of the exhaust gas, upstream of any exhaust-gas cooling device that may be provided for the treatment of the exhaust gases, for example for recirculation into at least one combustion chamber of the internal combustion engine. In particular, the exhaust-gas-conducting line is formed so as to be rigid in relation to the housing of the exhaust-gas treatment unit as a whole or only in relation to the crimp zones.

The exhaust-gas treatment unit is, in particular, formed in such a way that it is received entirely by the exhaust-gas-conducting line. In other words, this also means in particular that the exhaust-gas treatment unit is completely surrounded by the exhaust-gas-conducting line without interrupting or penetrating the exhaust-gas-conducting line, wherein the exhaust-gas-conducting line has a one-piece form preferably in the entire region around the exhaust-gas treatment unit and/or has no partition, receptacle, widening, etc. running in the circumferential direction of the exhaust-gas treatment unit. This also means, in particular, that no components of the exhaust-gas treatment unit project out of the exhaust-gas-conducting line. It is thus the case firstly that the flexibility of the configuration of the exhaust-gas treatment unit in an exhaust-gas-conducting line is increased, with the line no longer being constricted in flange regions, and secondly structural modifications, cumbersome sealing devices or seals and, in particular, additional components of the exhaust-gas treatment unit can be dispensed with. Overall, the number of required construction and assembly steps is decreased.

In accordance with another advantageous feature of the internal combustion engine of the invention, the at least one exhaust-gas treatment unit can be positioned fixedly with the exhaust-gas-conducting line in a force-locking manner. In this case, the exhaust-gas treatment unit can, in particular, be positioned fixedly by an interference fit by using an oversize in relation to the exhaust-gas-conducting line. The oversize of the exhaust-gas treatment unit may either already be provided at room temperature before installation, or else may first impart its adequate force in the operating state at operating temperature. Furthermore, the oversize may also first be realized retroactively during installation by using an additional structural element such as a temperature expansion ring.

In accordance with a further advantageous feature of the internal combustion engine of the invention, the exhaust-gas treatment unit is fixed at least at one side by calking. In this case, the line wall of the exhaust-gas-conducting line is deformed at one opening side in such a way that force-locking and form-locking are generated between the exhaust-gas treatment unit and the exhaust-gas-conducting line. The fixing device or fixation is suitable, in particular, for aluminum lines, for example lines formed as a bore into an aluminum cylinder head. Further fixing may also be produced in this way, in particular in the case of conical bores, for example.

In accordance with an added advantageous feature of the internal combustion engine of the invention, at least one of the exhaust-gas treatment units provided herein corresponds to the above-described exhaust-gas treatment unit according to the invention having at least one connecting device or connector.

With the objects of the invention in view, there is concomitantly provided a motor vehicle, comprising an internal combustion engine according to the invention with at least one exhaust-gas treatment unit according to the invention.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in an exhaust gas treatment unit for an exhaust gas recirculation line and an internal combustion engine and a motor vehicle having an exhaust-gas treatment unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
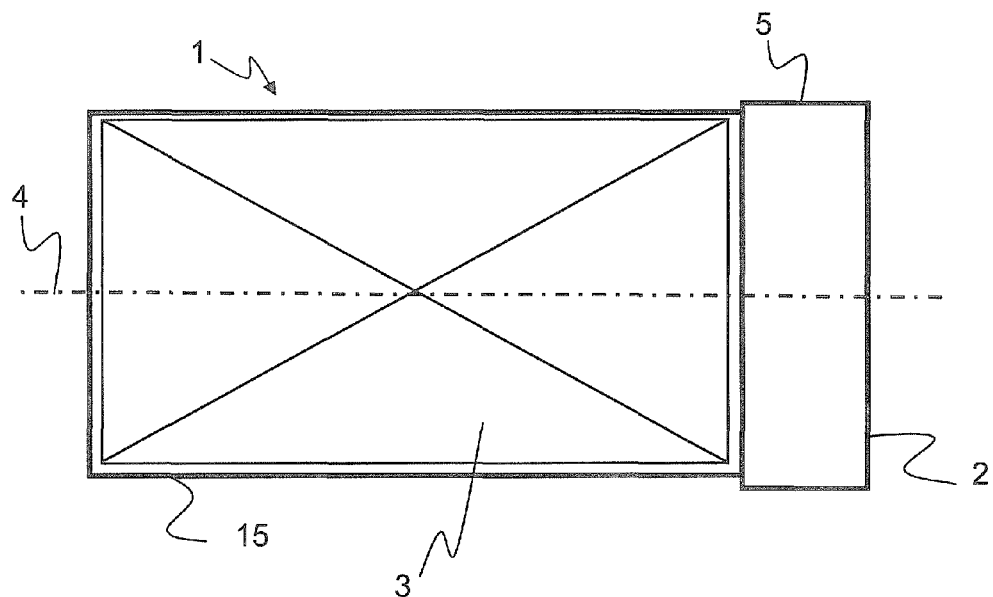
FIG. 1 is a diagrammatic, side-elevational view of an exhaust-gas treatment unit with a crimp zone.
Figure 2:
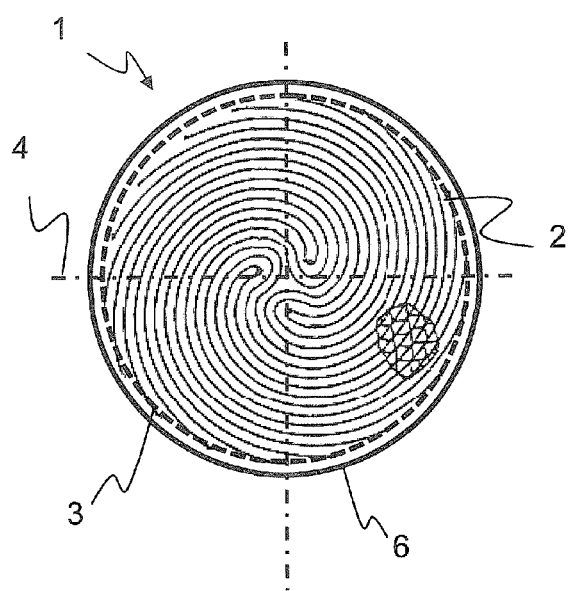
FIG. 2 is a cross-sectional view of the exhaust-gas treatment unit of FIG. 1.

Referring now to the figures of the drawings in detail and first, particularly, to FIG. 1 thereof, there is seen an exhaust-gas treatment unit 1 having a housing 15, a (single) exhaust-gas treatment body 3, a crimp, compression, pinch or squeeze zone 5 at one opening side 2 and a main axis 4. The crimp zone 5 is concentric with the main axis of the exhaust-gas treatment body 3 and also has a step relative to the exhaust-gas treatment body 3. FIG. 2 shows a plan view of the opening side 2 of the exhaust-gas treatment unit 1 and a cross section 6 of the crimp zone 5 relative to the exhaust-gas treatment body 3 of FIG. 1. It can be seen therein that the cross section 6 corresponds to the shape of the exhaust-gas treatment body 3. A structure composed of alternating corrugated and smooth foils wound in an S-shape is illustrated therein representatively for various honeycomb structures.

Figure 3:
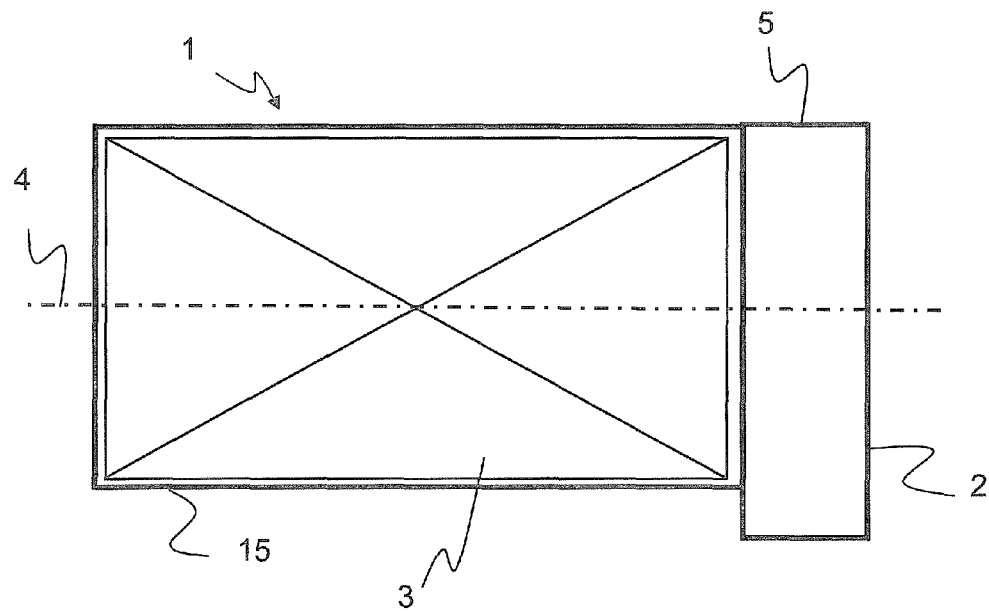
FIG. 3 is a side-elevational view of a further exhaust-gas treatment unit with an eccentric crimp zone and a deviating cross section.

FIG. 3 shows an exhaust-gas treatment unit 1 having an exhaust-gas treatment body 3 and a crimp zone 5 which is situated on an opening side 2 of the exhaust-gas treatment unit 1. It can be seen even in this view that the crimp zone 5 is disposed eccentrically.

Figure 4:
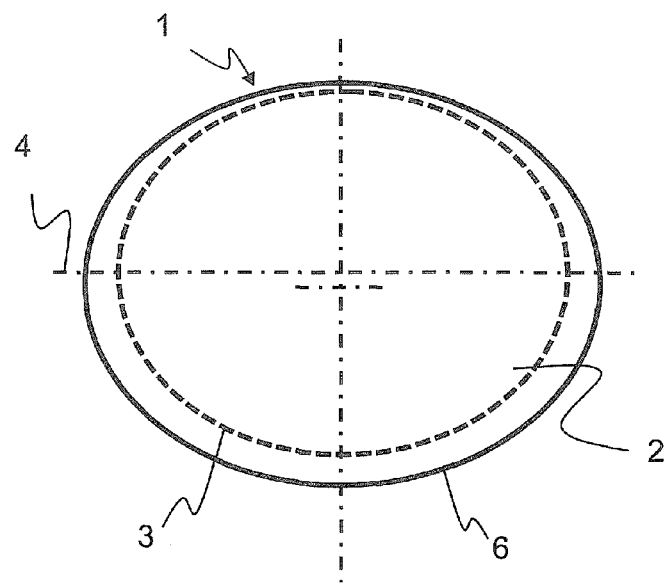
FIG. 4 is a cross-sectional view of the exhaust-gas treatment unit of FIG. 3.

FIG. 4 is a plan view showing the opening side 2 of the exhaust-gas treatment unit 1 of FIG. 3 and illustrating that the cross section 6 is disposed eccentrically with respect to the main axis 4. It can also be seen that the cross section 6 deviates from the shape of the exhaust-gas treatment body 3.

Figure 5:
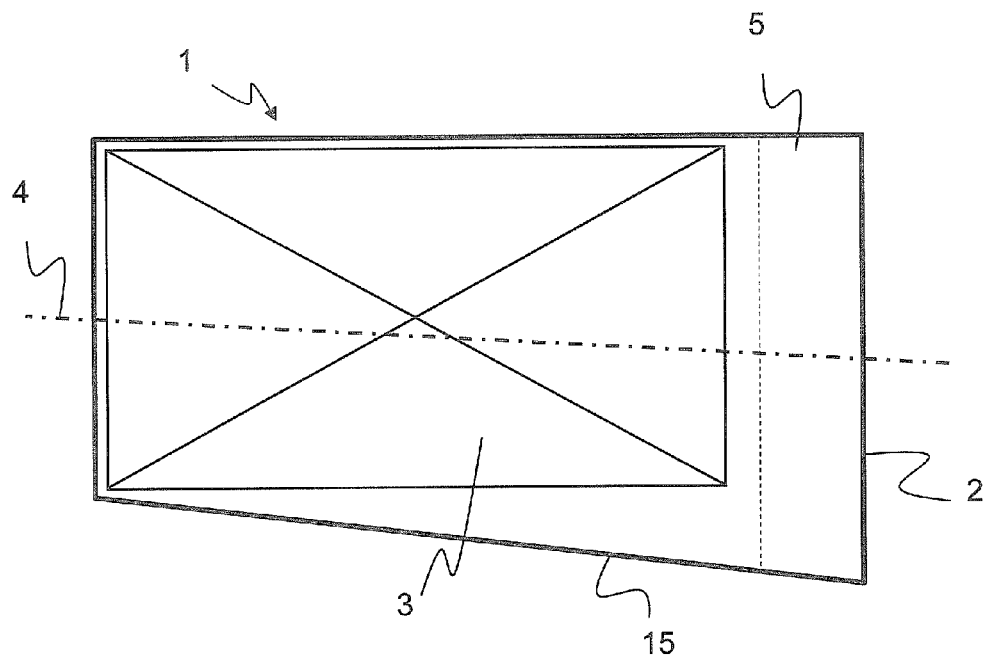
FIG. 5 is a side-elevational view of an exhaust-gas treatment unit with a flowing transition from an exhaust-gas treatment body to the crimp zone.

FIG. 5 shows an exhaust-gas treatment unit 1 having an exhaust-gas treatment body 3 and a crimp zone 5 at the opening side 2, in which a transition from the exhaust-gas treatment body 3 to the crimp zone has a flowing or free-flowing form. Merely for clarification, a thin dashed line is shown which divides the exhaust-gas treatment body 3 from the crimp zone 5. The main axis 4 is illustrated in FIG. 5 as being inclined, although it may also, in the case of a deviating form of the internal configuration of the exhaust-gas treatment body 3, be plotted horizontally in relation to the illustration.

Figure 6:
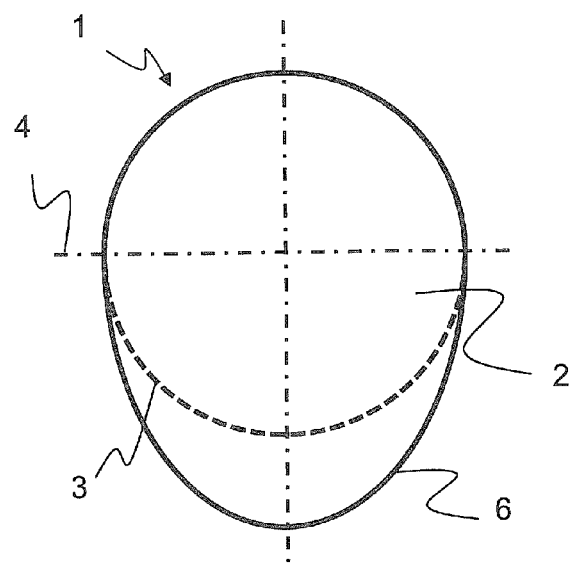
FIG. 6 is a cross-sectional view of the exhaust-gas treatment unit of FIG. 5.

FIG. 6 is another plan view showing the opening side 2 and the cross section 6 of the exhaust-gas treatment unit 1 of FIG. 5. It can be seen therein that the cross section 6 deviates only partially from the shape of the exhaust-gas treatment body 3.

Figure 7:
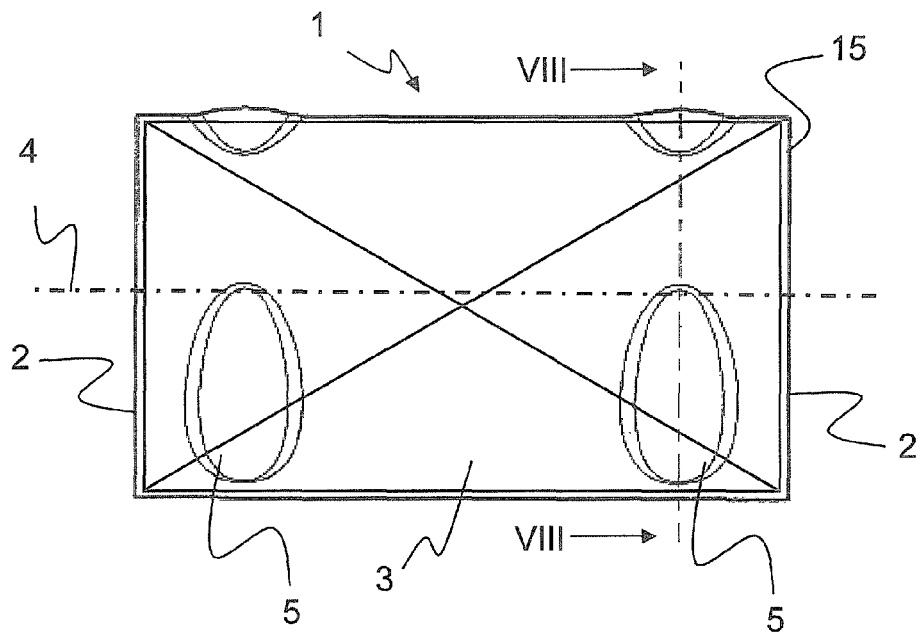
FIG. 7 is a side-elevational view of an exhaust-gas treatment unit with bulges at two opening sides.

FIG. 7 shows an exhaust-gas treatment unit 1 having an exhaust-gas treatment body 3 and two crimp zones 5 at two respective opening sides 2, in which a transition from the exhaust-gas treatment body 3 to the crimp zone has a flowing or free-flowing form. Merely for clarification, oval lines are shown which indicate the elevation of the crimp zone 5 in relation to the exhaust-gas treatment body 3. In each case three bulges are formed into both crimp zones over the circumference of the exhaust-gas treatment unit 1.

Figure 8:
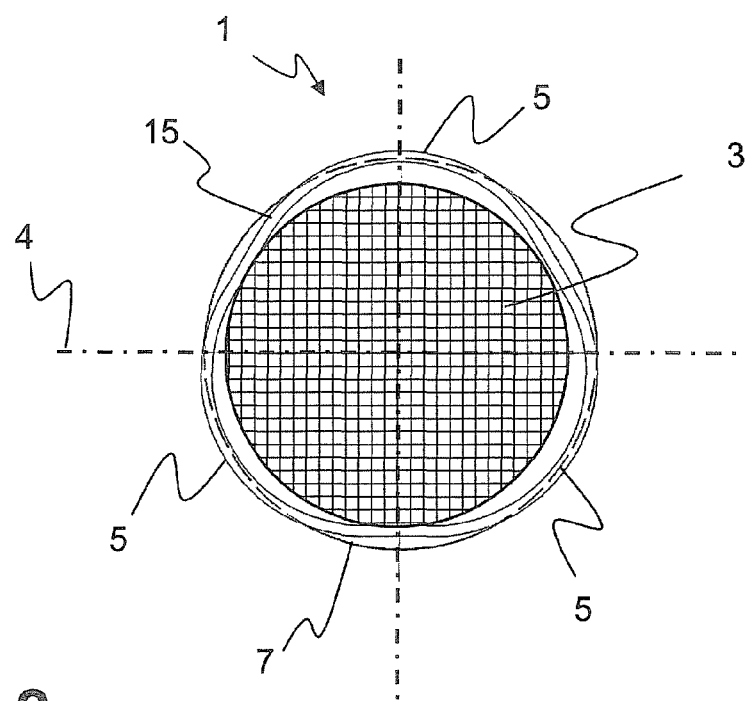
FIG. 8 is a cross-sectional view of an exhaust-gas treatment device with a bulged connecting device.

FIG. 8 shows, by way of example, a section taken along a line VIII-VIII in FIG. 7, in the direction of the arrows, which is superposed on a planned installation situation in an exhaust-gas-conducting line 7. It can be seen therein that the cross section 6 deviates (inwardly and outwardly) from the shape of the exhaust-gas-conducting line 7 over the entire circumference of the exhaust-gas treatment unit 1. If the exhaust-gas treatment unit 1 is actually inserted, the housing 15 deforms in the region of the crimp zones 5, although the exhaust-gas treatment body 3 is not significantly affected thereby.

Figure 9:
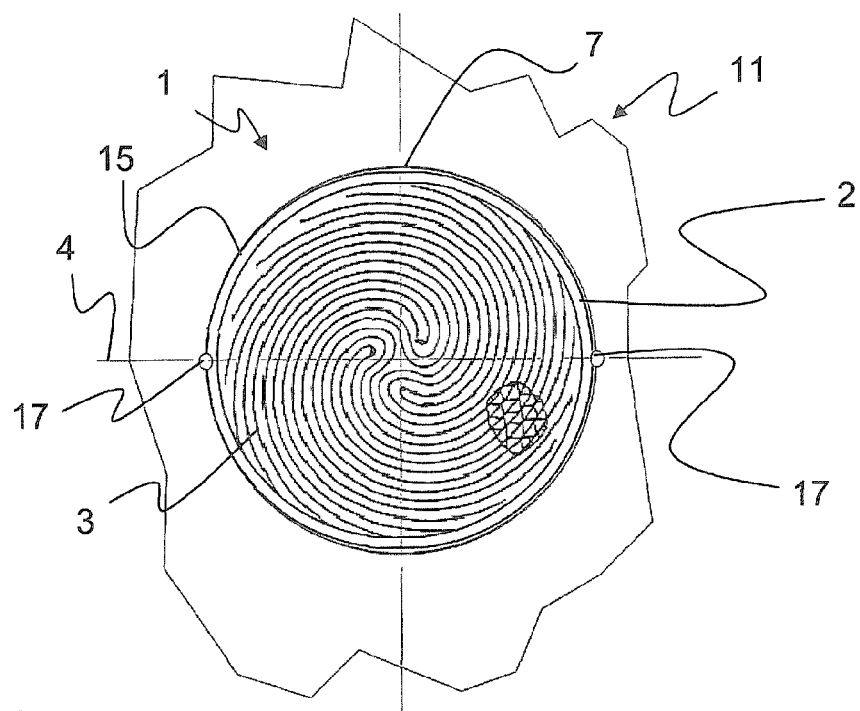
FIG. 9 is a cross-sectional view of an exhaust-gas treatment unit in an exhaust-gas-conducting line with calking.

FIG. 9 is a plan view of an opening side 2 showing the cross section 6 of an exhaust-gas treatment unit 1 pushed into an exhaust-gas-conducting line 7 in an internal combustion engine 11. Two calking points 17, which prevent the exhaust-gas treatment unit 1 from becoming detached, are illustrated therein by way of example.

Figure 10:
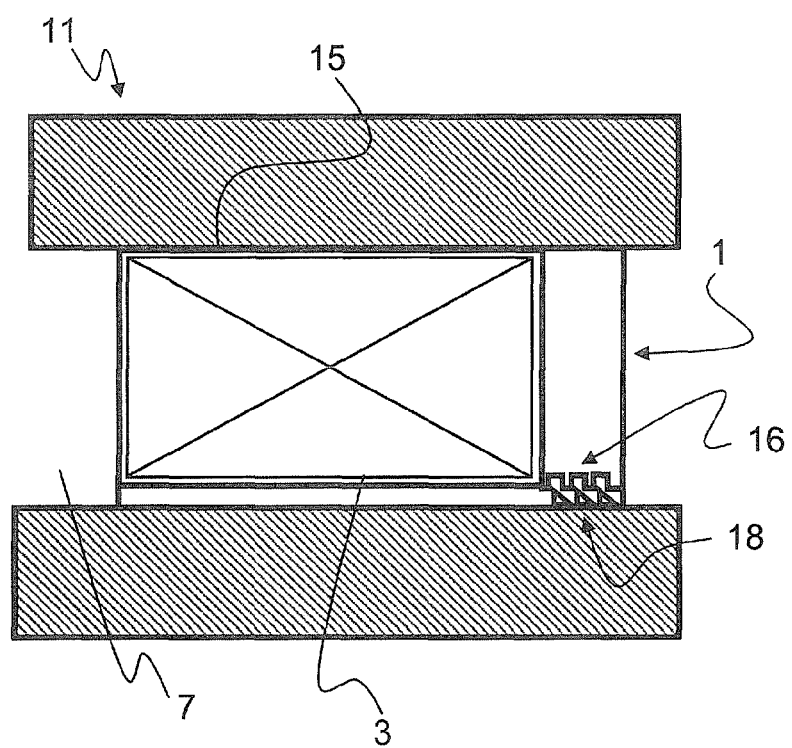
FIG. 10 is a partly longitudinal-sectional view of an exhaust-gas treatment unit in an exhaust-gas-conducting line with a shaped structure.

FIG. 10 is a partly-sectional, side view showing an exhaust-gas treatment unit 1 pushed into an exhaust-gas-conducting line 7 in an internal combustion engine 11. In this case, the exhaust-gas treatment unit 1 has an offset connecting device or connector with a shaped structure 16. The shaped structure 16 is latched in a form-locking manner into a corresponding line structure 18. The housing 15 bears, over the entire circumference, against the exhaust-gas-conducting line 7, but in the region of the shaped structure 16 has a notch formation in order to ensure that the exhaust-gas treatment unit 1 can be inserted over the line structure 18 from right to left as seen in the illustration in the figure.

Figure 11:
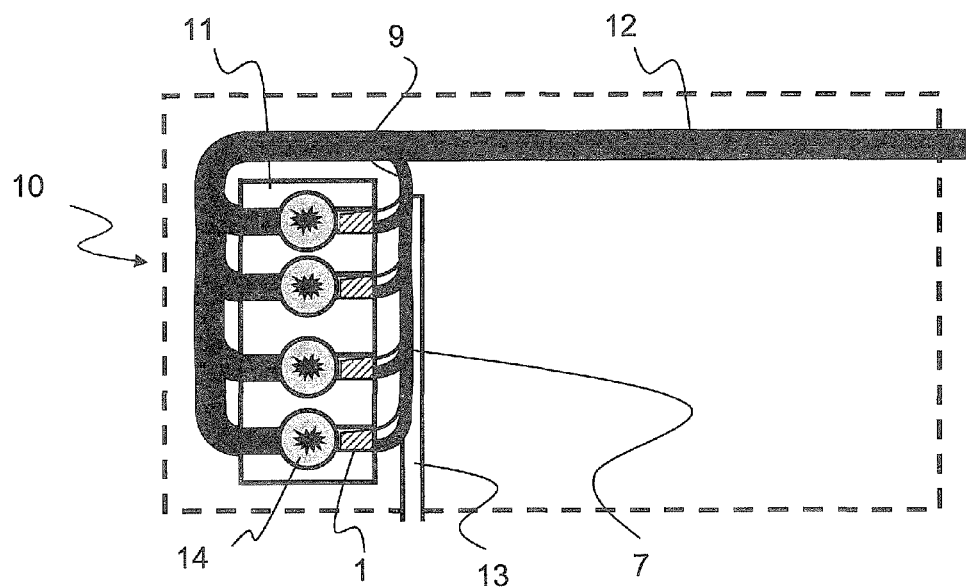
FIG. 11 is a plan view of a portion of a motor vehicle having four exhaust-gas treatment units in an intake line.

FIG. 11 shows a motor vehicle 10 having an internal combustion engine 11. The internal combustion engine 11 has an exhaust line 12 which leads from a combustion chamber 14 to the outside. Furthermore, the internal combustion engine 11 also includes an air line 13 which supplies air from the outside to the combustion chamber. The air line is supplemented by an exhaust-gas-conducting line 7 through which exhaust gases coming from the exhaust line 12 and passing through an exhaust-gas recirculation line 9 are recirculated, in a mixture with air from the air line 13, into the combustion chamber 14. Before the exhaust-gas/air mixture can enter the combustion chamber 14, it is purified by the exhaust-gas treatment units 1 situated upstream.

Figure 12:
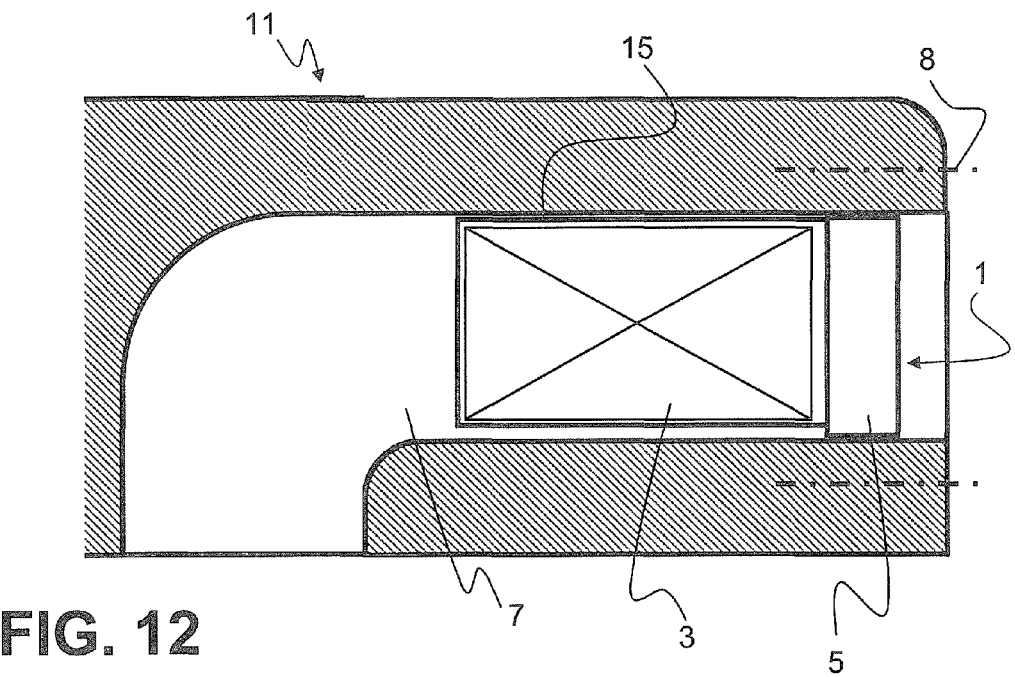
FIG. 12 is a partly longitudinal-sectional view of an exhaust-gas treatment unit in an intake line.

FIG. 12 shows, in detail, a configuration of the exhaust-gas treatment unit 1 in the internal combustion engine 11 or the exhaust-gas-conducting line 7. As a result of the spacing between the exhaust-gas treatment unit 1 and the exhaust-gas-conducting line 7, it can be seen that it is possible for only the crimp zone 5, but not the exhaust-gas treatment body 3, to be in contact with the exhaust-gas-conducting line, although this is not imperatively necessary. In fact, a (plastic) deformation of the crimp zone 5 may occur in such a way that the remaining region of the housing 15 is also (partially) deformed. FIG. 12 is based on the exhaust-gas treatment unit 1 in the embodiment of FIG. 3. It can be seen that the crimp zone 5 is deformed in the installed state. A force-locking connection is thereby ensured. The section of the exhaust-gas-conducting line 7 shown in FIG. 12 may, for example, be a portion of a cylinder head of an internal combustion engine 11. In this case, the non-illustrated exhaust-gas recirculation line 9 may be mounted by using a diagrammatically illustrated fastening device or fastener 8 (dash-dotted lines) in such a way that no retention device for an exhaust-gas treatment unit 1 according to the invention need be disposed in between.

Figure 13:
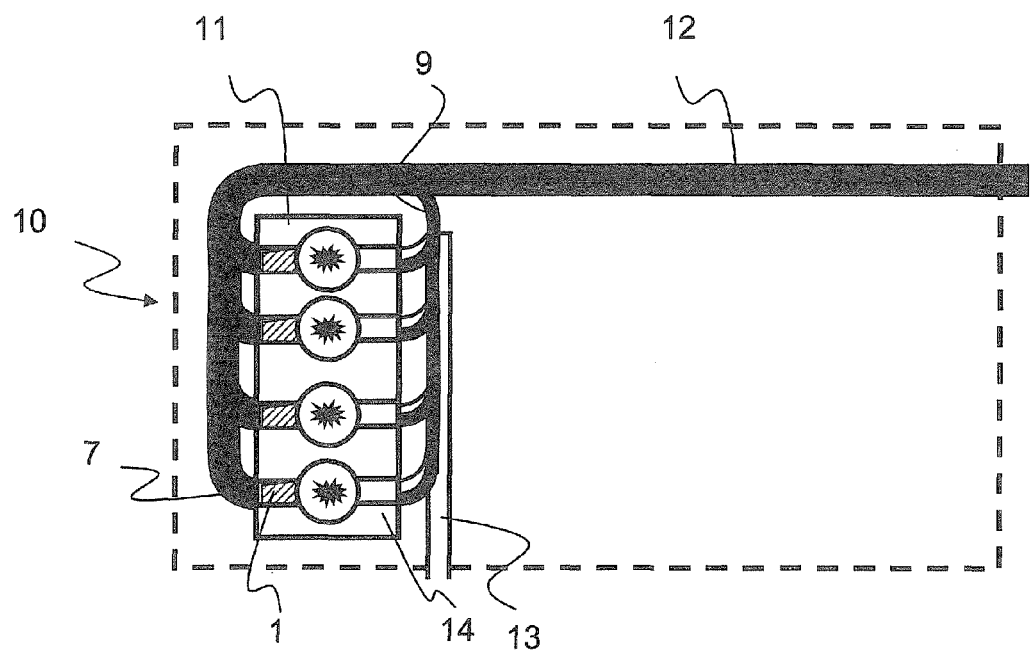
FIG. 13 is a plan view of a portion of a motor vehicle having four exhaust-gas treatment units in the exhaust line.

FIG. 13 shows a motor vehicle 10 having an internal combustion engine 11 corresponding to the illustration in FIG. 11. Contrary to FIG. 11, the exhaust-gas treatment units 1 are disposed, as seen in the flow direction of the exhaust gas, (directly) downstream of the combustion chambers 14. The exhaust gas is thus purified directly after the combustion.

Figure 14:
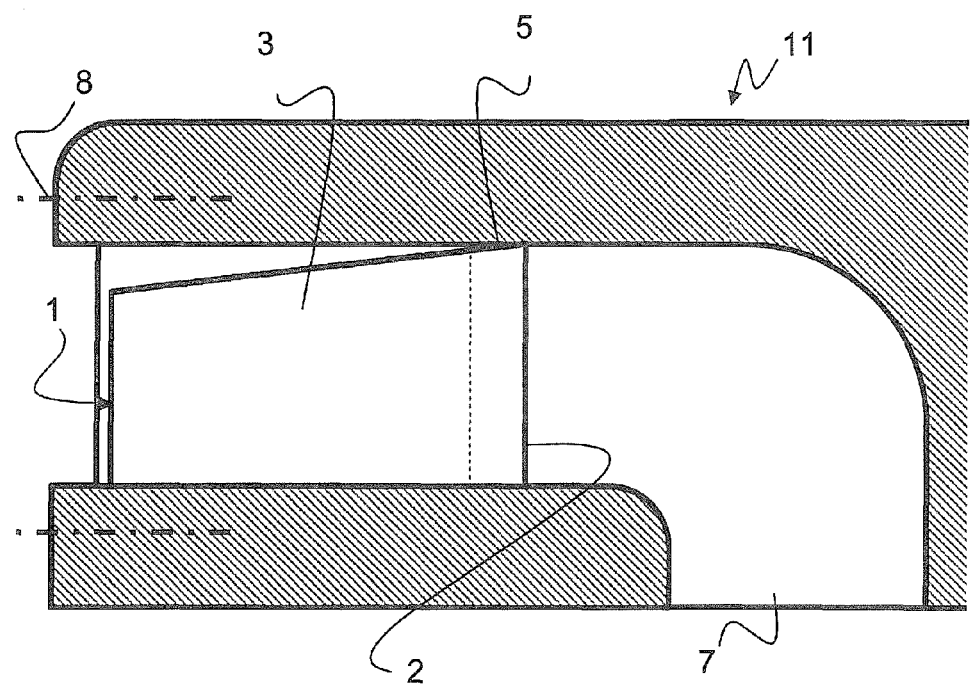
FIG. 14 is a partly longitudinal-sectional view of an exhaust-gas treatment unit in an exhaust line.

FIG. 14 shows details of a configuration of the exhaust-gas treatment unit 1 in the exhaust-gas-conducting line 7. The exhaust-gas treatment unit 1 of FIG. 5 has been used therein as a basis. In this case, it can be seen even more clearly that primarily the crimp zone 5 and not the exhaust-gas treatment body 3 has been deformed. In this case, the opening side 2 is simultaneously the inlet side of the exhaust gas to be purified coming from the exhaust-gas-conducting line 7. Since the highest thermal loads, and mechanical loads resulting from the pulsation, are to be expected at that side, the configuration appears to be particularly expedient, although that is not imperatively necessary. It can also be seen in this configuration that the exhaust line 12 or an exhaust manifold can be fastened to the cylinder head of the internal combustion engine 11 without further intermediate pieces by using the diagrammatically illustrated fastening device or fastener 8 (dash-dotted lines). In this way, inter alia, the number of fitting surfaces and sealing surfaces is reduced.

The invention thus at least partially solves the technical problems highlighted in conjunction with the prior art. In particular, a device has been proposed which can be positioned fixedly in an exhaust-gas-conducting line without external retention devices. This, inter alia, simplifies assembly and increases the flexibility of the configuration of the exhaust-gas treatment unit.

The invention claimed is:

1. An exhaust-gas treatment unit, comprising:
a housing having a periphery and a circumferential direction;
at least one opening side;
a substantially cylindrical exhaust-gas treatment body having a main axis; and
at least one connector formed in one piece with said housing and disposed on said at least one opening side, said at least one connector being an offset crimp zone configured and dimensioned for forming an interference fit between the exhaust-gas treatment unit and an exhaust gas conducting line, said at least one connector having a cross section differing from said substantially cylindrical exhaust-gas treatment body, and said crimp zone being a bulge extending partially over said periphery in said circumferential direction, said cross section deviating inwardly and outwardly from a shape of the exhaust-gas conducting line.

2. The exhaust-gas treatment unit according to claim 1, wherein said at least one connector is disposed eccentrically relative to said main axis.

3. The exhaust-gas treatment unit according to claim 1, wherein said housing has an axial portion, said crimp zone is formed with said housing, and said axial portion of said housing is not filled by said exhaust gas treatment body.

4. The exhaust-gas treatment unit according to claim 1, wherein said crimp zone has a larger size than a remainder of the exhaust gas treatment unit.

5. The exhaust-gas treatment unit according to claim 1, wherein said crimp zone is configured to deform radially inwardly, without deforming said exhaust gas treatment body.

6. The exhaust-gas treatment unit according to claim 1, wherein said bulge is one of a plurality of bulges disposed at different locations in said circumferential direction.

7. The exhaust-gas treatment unit according to claim 1, wherein a deformation of said bulge caused by installing the exhaust-gas treatment unit in the exhaust gas conducting line causes substantially no deformation of a remainder of said housing.

8. An internal combustion engine, comprising:
at least one exhaust-gas-conducting line; and
at least one exhaust-gas treatment unit inserted entirely into said at least one exhaust-gas-conducting line, said at least one exhaust-gas treatment unit including:
a housing having a periphery and a circumferential direction;
at least one opening side;
a substantially cylindrical exhaust-gas treatment body having a main axis; and
at least one connector formed in one piece with said housing and disposed on said at least one opening side, said at least one connector being an offset crimp zone forming an interference fit between said exhaust-gas treatment unit and said at least one exhaust gas conducting line, said at least one connector having a cross section differing from said substantially cylindrical exhaust-gas treatment body, and said crimp zone being a bulge extending partially over said periphery in said circumferential direction.

9. The internal combustion engine according to claim 8, wherein said exhaust-gas treatment unit is fixed at least at one side by calking.

10. The exhaust-gas treatment unit according to claim 8, wherein said interference fit has the characteristics of being formed from said crimp zone having a cross section with said bulge deviating inwardly and outwardly from a shape of said exhaust-gas conducting line.

11. A motor vehicle, comprising:
an internal combustion engine having at least one exhaust-gas-conducting line and having at least one exhaust-gas treatment unit inserted entirely into said at least one exhaust-gas-conducting line, said at least one exhaust-gas treatment unit including:
a housing having a periphery and a circumferential direction;
at least one opening side;
a substantially cylindrical exhaust-gas treatment body having a main axis; and
at least one connector formed in one piece with said housing and disposed on said at least one opening side, said at least one connector being an offset crimp zone forming an interference fit between said exhaust-gas treatment unit and said at least one exhaust gas conducting line, said at least one connector having a cross section differing from said substantially cylindrical exhaust-gas treatment body, and said crimp zone being a bulge extending partially over said periphery in said circumferential direction.

12. The exhaust-gas treatment unit according to claim 11, wherein said interference fit has the characteristics of being formed from said crimp zone having a cross section with said bulge deviating inwardly and outwardly from a shape of said exhaust-gas conducting line.

* * * * *